United States Patent
Varillas et al.

(10) Patent No.: US 9,279,370 B2
(45) Date of Patent: Mar. 8, 2016

(54) TURBOMACHINE AND METHOD OF OPERATING A TURBOMACHINE TO PERFORM A FUEL CHANGE OVER AT A HIGH LOAD

(75) Inventors: Gerardo Fidel Varillas, Simpsonville, SC (US); Mustafa Ahmed Abdullah, Doha (QA); Scott Arthur Day, Greenville, SC (US); Stephen Robert Thomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 655 days.

(21) Appl. No.: 13/284,510

(22) Filed: Oct. 28, 2011

(65) Prior Publication Data

US 2013/0104558 A1 May 2, 2013

(51) Int. Cl.
*F02C 9/00* (2006.01)
*F02C 9/30* (2006.01)
*F02C 9/40* (2006.01)
*F02C 9/28* (2006.01)

(52) U.S. Cl.
CPC ... *F02C 9/30* (2013.01); *F02C 9/40* (2013.01); *F02C 9/28* (2013.01); *F05B 2270/103* (2013.01)

(58) Field of Classification Search
CPC ... F23R 3/36; F04D 27/0223; F04D 27/0207; F04D 27/0215
USPC .............. 60/742, 746, 793, 39.463, 776, 773
See application file for complete search history.

(56) References Cited

U.S. PATENT DOCUMENTS

| | | | |
|---|---|---|---|
| 3,875,380 A * | 4/1975 | Rankin | 700/69 |
| 6,145,294 A * | 11/2000 | Traver et al. | 60/776 |
| 6,330,789 B2 * | 12/2001 | Onoda et al. | 60/773 |
| 6,370,863 B2 | 4/2002 | Muller et al. | |
| 6,532,726 B2 | 3/2003 | Norster et al. | |
| 6,694,745 B2 | 2/2004 | Stalder et al. | |
| 6,814,032 B2 | 11/2004 | Goto | |
| 6,928,821 B2 * | 8/2005 | Gerhold | 60/775 |
| 7,107,771 B2 | 9/2006 | Eroglu et al. | |
| 7,430,868 B2 | 10/2008 | Socher | |
| 7,434,403 B2 | 10/2008 | Brautsch et al. | |
| 7,594,402 B2 | 9/2009 | Eroglu et al. | |
| 7,770,400 B2 * | 8/2010 | Iasillo et al. | 60/776 |
| 7,832,191 B2 | 11/2010 | Osakabe et al. | |
| 7,913,673 B2 | 3/2011 | Vanderslice et al. | |
| 8,276,363 B2 * | 10/2012 | Seely et al. | 60/243 |
| 2008/0098746 A1 * | 5/2008 | Iasillo et al. | 60/776 |
| 2009/0094960 A1 * | 4/2009 | Eroglu et al. | 60/39.12 |
| 2010/0175666 A1 | 7/2010 | Nishio et al. | |
| 2011/0126546 A1 * | 6/2011 | Meeuwissen et al. | 60/772 |
| 2011/0289932 A1 * | 12/2011 | Thompson | 60/776 |
| 2012/0192542 A1 * | 8/2012 | Chillar et al. | 60/39.463 |

* cited by examiner

*Primary Examiner* — Gerald L Sung
(74) *Attorney, Agent, or Firm* — Ernest G. Cusick; Frank A. Landgraff

(57) ABSTRACT

A turbomachine is provided and includes a compressor to compress inlet gas to produce compressed gas, a combustor coupled to the compressor in which the compressed gas is combusted along with a first fuel and/or a second fuel to produce a fluid flow, a turbine coupled to the combustor through which the fluid flow is directed for power and/or electricity generation and first and second supply circuits to supply the first fuel and the second fuel to the combustor, respectively. The first and second supply circuits are operable to enable transfers between operations associated with the first fuel and the second fuel being respectively supplied to the combustor at a high load.

7 Claims, 3 Drawing Sheets

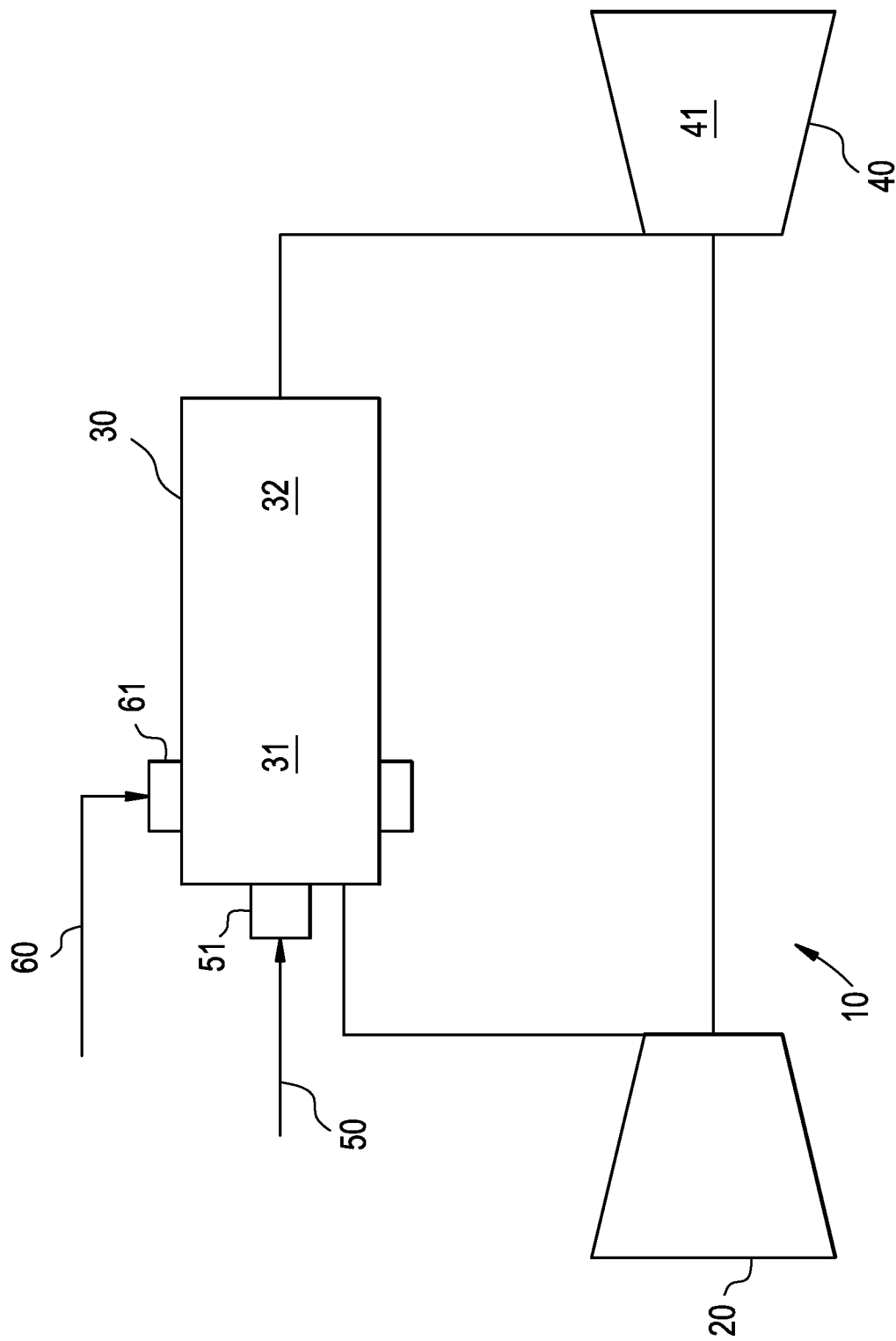

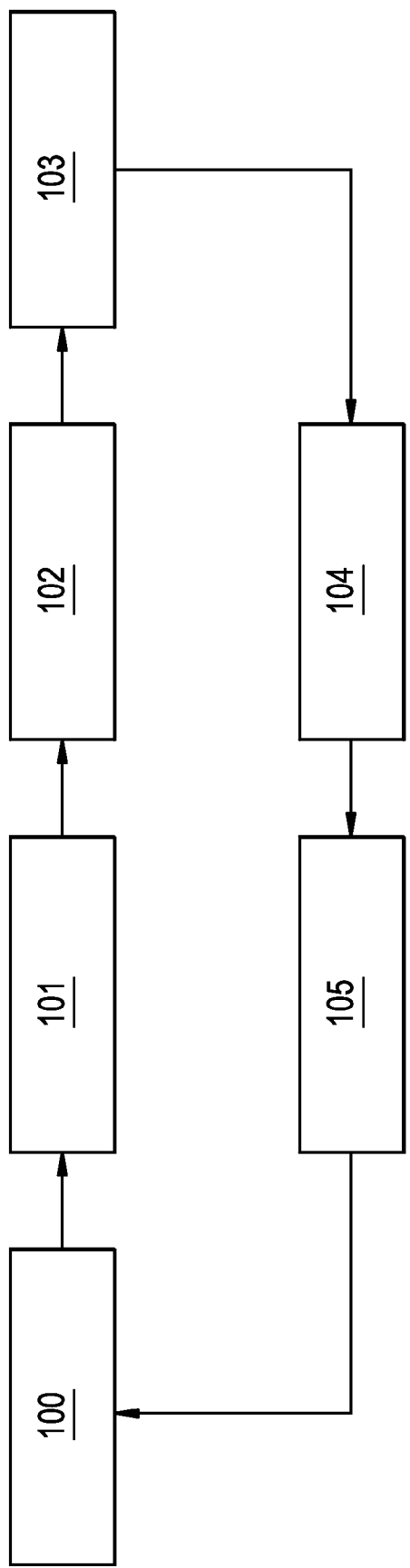

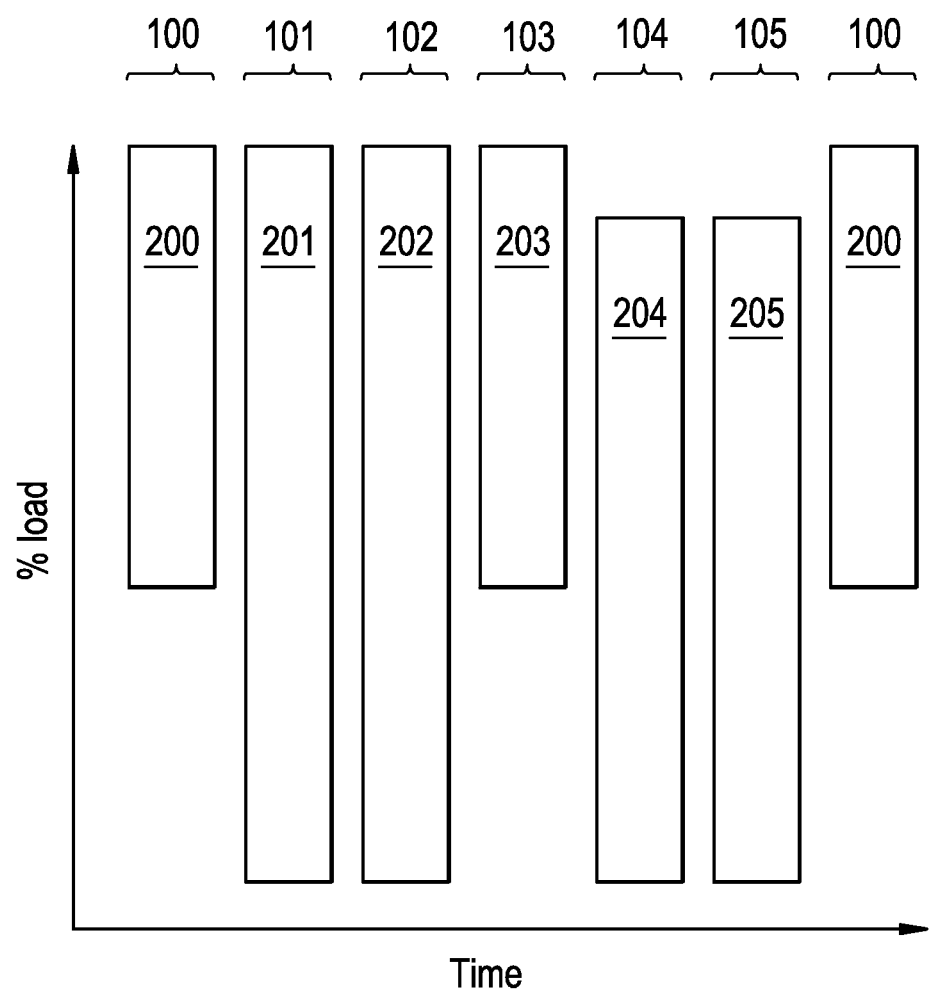

US 9,279,370 B2

TURBOMACHINE AND METHOD OF OPERATING A TURBOMACHINE TO PERFORM A FUEL CHANGE OVER AT A HIGH LOAD

BACKGROUND OF THE INVENTION

The subject matter disclosed herein relates to a turbomachine and, more particularly, to a method of operating a turbomachine to perform a fuel change over at a high load.

Typically, a turbomachine includes a compressor, a combustor and a turbine. The compressor compresses inlet gas to produce and output compressed gas. The combustor is fluidly coupled to the compressor to be receptive of the compressed gas and formed to define an interior in which the compressed gas is mixed with gas fuel and/or liquid fuel and combusted to produce a fluid flow of, for example, high temperature fluids. The fluid flow is then output from the combustor toward the turbine, which is formed to define a pathway through which the fluid flow is directed for power and/or electricity generation operations.

On heavy units equipped with dry low NOx (DLN) combustors, the liquid fuel (i.e., the distillate) is available as a backup fuel. In case of a problem with the gas fuel (i.e., the main fuel), the unit is transferred to the backup fuel. However, once the supply conditions are restored on the main fuel, the operator is required to reduce the load to a relatively low load, such as less than 30 MW or a relatively low power generation level depending on the turbomachine rating, in order to return to go back to the main fuel.

BRIEF DESCRIPTION OF THE INVENTION

According to one aspect of the invention, a turbomachine is provided and includes a compressor to compress inlet gas to produce compressed gas, a combustor coupled to the compressor in which the compressed gas is combusted along with a first fuel and/or a second fuel to produce a fluid flow, a turbine coupled to the combustor through which the fluid flow is directed for power and/or electricity generation and first and second supply circuits to supply the first fuel and the second fuel to the combustor, respectively. The first and second supply circuits are operable to enable transfers between operations associated with the first fuel and the second fuel being respectively supplied to the combustor at a high load.

According to another aspect of the invention, a method of operating a turbomachine to perform a fuel change over at a high load is provided. The method includes enabling first fuel diffusion at a high load, transferring from a first fuel mode to a second fuel mode at the high load, operating in the second fuel mode at the high load for a period of stabilization and transferring from the second fuel mode to a first fuel mode at the high load.

According to yet another aspect of the invention, a method of operating a turbomachine to perform fuel change over at a high load is provided. The method includes operating first and second gas fuel modes at first and second load ranges, respectively, operating first and second liquid fuel modes at third and fourth load ranges, respectively, the third load range being similar to the second load range and the fourth load range being similar to the first load range, operating a third liquid fuel mode at a fifth load range, which at least partly overlaps with the fourth load range and operating a third gas fuel mode at a sixth load percentage range, which is similar to the fifth load range.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of a turbomachine in accordance with embodiments;

FIG. 2 is a flow diagram illustrating an operation of the turbomachine of FIG. 1; and FIG. 3 is a graphical depiction of load ranges of the operation of FIG. 2.

The detailed description explains embodiments of the invention, together with advantages and features, by way of example with reference to the drawings.

DETAILED DESCRIPTION OF THE INVENTION

With reference to FIG. 1, a turbomachine 10 is provided as, for example, a gas turbine engine. As shown, the turbomachine 10 includes a compressor 20, a combustor 30 and a turbine 40. The compressor 20 is configured to compress inlet gas to produce and output compressed gas. The combustor 30 is fluidly coupled to the compressor 20 to be receptive of the compressed gas output from the compressor 20. The combustor 30 is formed to define a first interior 31 and a second interior 32. Within the first interior 31, the compressed gas is mixed with a first or main fuel (hereinafter referred to as "gas fuel") and/or a second or backup fuel (hereinafter referred to as "liquid fuel") to form a mixture. Within the second interior 32, the mixture is combusted to produce a fluid flow of, for example, high temperature fluids. The fluid flow is then output from the combustor 30 toward the turbine 40. The turbine 40 is fluidly coupled to the combustor 30 to be receptive of the fluid flow and formed to define a pathway 41 through which the fluid flow may be directed for power and/or electricity generation operations.

The turbomachine 10 further includes a first supply circuit 50 and a second supply circuit 60. The first supply circuit 50 is configured to supply the gas fuel to the combustor 30 such that the turbomachine 10 can be operated in one or more gas fuel modes. The one or more gas fuel modes include, but are not limited to, dry low NOx (DLN) modes, which are associated with relatively low emissions of oxides of nitrogen, and high emissions modes. In accordance with embodiments, the first supply circuit 50 may include a gas fuel injector 51, such as a gas fuel diffusion manifold, which is configured to inject at least the gas fuel into the first interior 31. The second supply circuit 60 is configured to supply the liquid fuel to the combustor 30 such that the turbomachine 10 can be operated in one or more liquid fuel modes. The one or more liquid fuel modes include, but are not limited to, high emissions modes and wet low NOx modes. In accordance with embodiments, the second supply circuit 60 may include a liquid fuel injector 61, such as a liquid fuel manifold, which is configured to inject at least the liquid fuel into the first interior 31.

The first supply circuit 50 and the second supply circuit 60 are each operable to enable transfers between operations of the turbomachine 10, which are associated with the gas fuel and the liquid fuel being respectively supplied to the combustor 30 at a high load percentage of the turbomachine 10. As such, it may be unnecessary for an operator of the turbomachine 10 to unload the turbomachine 10 during gas fuel/liquid fuel change overs.

In accordance with aspects, a method of operating the turbomachine 10 to perform a fuel change over between the gas fuel and the liquid fuel at a high load percentage of the turbomachine 10 is provided. The method includes enabling, for example, the gas fuel injector 51 to in turn enable gas diffusion at a high load and to thereby enable or facilitate a fuel transfer from a gas fuel mode to a liquid fuel mode. The method further includes transferring from the gas fuel mode to the liquid fuel mode at the high load, operating in the liquid fuel mode at the high load for a period of stabilization and transferring from the liquid fuel mode to a new gas fuel mode at the high load. In accordance with embodiments, the gas fuel mode may include a premix mode.

With reference to FIGS. 2 and 3 and, in accordance with aspects, a method of operating the turbomachine 10 to perform a fuel change over at a high load is provided. The method includes operating the turbomachine 10 in first and second gas fuel modes 100, 101 at first and second load ranges 200, 201, respectively, and operating the turbomachine 10 at first and second liquid fuel modes 102, 103 at third and fourth load ranges 202, 203, respectively. The third load range 202 may be similar to the second load range 201 and the fourth load range 203 may be similar to the first load range 200. The first gas fuel mode may be a dry low NOx turbomachine 10 operation, which is characterized by relatively low emissions of pollutants, such as oxides of nitrogen, by the turbomachine 10. The second gas fuel mode may be a high emissions mode and may be associated with a problem with the gas fuel or first supply circuit 50. The first liquid fuel mode 102 may be another high emissions mode and may be associated with an operation of the turbomachine 10 following a change over to liquid fuel operations. The second liquid fuel mode 103 may be a wet low NOx turbomachine 10 operation and may be associated with normal liquid fuel operations that can be maintained until the problem with the gas fuel or the first supply circuit is resolved.

The method also includes operating the turbomachine 10 in a third liquid fuel mode 104 at a fifth load range 204, which at least partly overlaps with the fourth load range 203, operating the turbomachine 10 in a third gas fuel mode 105 at a sixth load range 205, which is similar to the fifth load range 204, and repeating the operating of the turbomachine 10 in the first gas fuel mode 100 at the first load range 200. The third liquid fuel mode 104 and the third gas fuel mode 105 may each be a high emissions mode and may be associated with a change over to the first gas fuel mode 100.

It is to be understood that the second gas fuel mode 101 may follow the first gas fuel mode 100, that the first liquid fuel mode 102 may follow the second gas fuel mode 101, that the second liquid fuel mode 103 may follow the first liquid fuel mode 102, that the third liquid fuel mode 104 may follow the second liquid fuel mode 103, and that the third gas fuel mode 105 may follow the third liquid fuel mode 104.

Also, as shown in FIG. 3, the first load range 200 extends from a middle load percentage of the turbomachine 10 to a high load percentage of the turbomachine 10. The second load range 201 extends from a low load percentage of the turbomachine 10 to a high load percentage of the turbomachine 10. The third load range 202 extends from a low load percentage of the turbomachine 10 to a high load percentage of the turbomachine 10. The fourth load range 203 extends from a middle load percentage of the turbomachine 10 to a high load percentage of the turbomachine 10. The fifth load range 204 extends from a low load percentage of the turbomachine 10 to a relatively high load percentage of the turbomachine 10, which is within the fourth load range 203. The relatively high load percentage of the fifth load range 204 may be substantially similar to the high load percentage of the fourth load range 203. In accordance with embodiments, for a heavy unit turbomachine, the relatively high load percentage of the fifth load range 204 may be associated with an output of about 170 MW. The sixth load range 205 is similar to the fifth load range 204 and extends from a low load percentage to a relatively high load percentage, which is within the fourth load range. As above, the relatively high load percentage of the sixth load range 205 may be substantially similar to the high load percentage of the fourth load range 203.

Thus, as described above, operation of the turbomachine 10 may be conducted in accordance with the exemplary schedule provided in the following table:

| Reference Numeral | Operation type | Mode |
| --- | --- | --- |
| 100 | Gas fuel operation | Dry Low NOx |
| 101 | Gas fuel operation | High emissions mode (diffusion circuit active) |
| 102 | Liquid fuel operation | High emissions mode (no diluent injection) |
| 103 | Liquid fuel operation with diluent injection | Low emissions mode |
| 104 | Liquid fuel operation | High emissions mode (no diluent injection) |
| 105 | Gas fuel operation | High emissions mode (diffusion circuit active) |

In accordance with embodiments, the second gas fuel mode 101 and the third gas fuel mode 105 may be substantially similar to one another in terms of at least their respective load ranges. Also, the first liquid fuel mode 102 and the third liquid fuel mode 104 may be substantially similar to one another in terms of at least their respective load ranges. Previously, turbomachine 10 operation has not permitted transitions between the third liquid fuel mode 104 (or an equivalent thereof) to the third gas fuel mode 105 at high load. As described above, however, a transition between the third liquid fuel mode 104 and the third gas fuel mode 105 at high load is permitted. This transition is then followed by a period of stabilization, during which the third gas fuel mode 105 is in effect, and a subsequent transition at high load from the third gas fuel mode 105 back to the first gas fuel mode 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a turbomachine to perform fuel change over at a high load, the method comprising:
    operating first and second gas fuel modes at first and second load ranges, respectively;
    operating first and second liquid fuel modes at third and fourth load ranges, respectively, the third load range being equal to the second load range and the fourth load range being equal to the first load range;

operating a third liquid fuel mode at a fifth load range, which at least partly overlaps with the fourth load range; and operating a third gas fuel mode at a sixth load range, which is equal to the fifth load range, wherein the second load range and the third load range each extends from a first load percentage associated with an output of less than 170 MW to a second load percentage associated with an output of more than 170 MW.

2. The method according to claim 1, further comprising repeating the operating of the first gas fuel mode at the first load range.

3. The method according to claim 1, wherein:

the second gas fuel mode follows in time the first gas fuel mode, the first liquid fuel mode follows in time the second gas fuel mode, the second liquid fuel mode follows in time the first liquid fuel mode, the third liquid fuel mode follows in time the second liquid fuel mode, and the third gas fuel mode follows in time the third liquid fuel mode.

4. The method according to claim 1, wherein the first and the fourth load range each extends from a third load percentage, which is greater than the first load percentage and associated with an output of less than 170 MW, to the second load percentage.

5. The method according to claim 4, wherein the fifth load range extends from the first load percentage to a fourth load percentage associated with an output of 170 MW.

6. The method according to claim 5, wherein the sixth load range extends from the first load percentage to the fourth load percentage.

7. The method according to claim 1, wherein the first gas fuel mode and the second liquid fuel modes comprise first emissions modes and the second and third gas fuel modes and the first and third liquid fuel modes each comprise second emissions modes, which are higher than the first emissions modes.

\* \* \* \* \*